Patented Oct. 30, 1923.

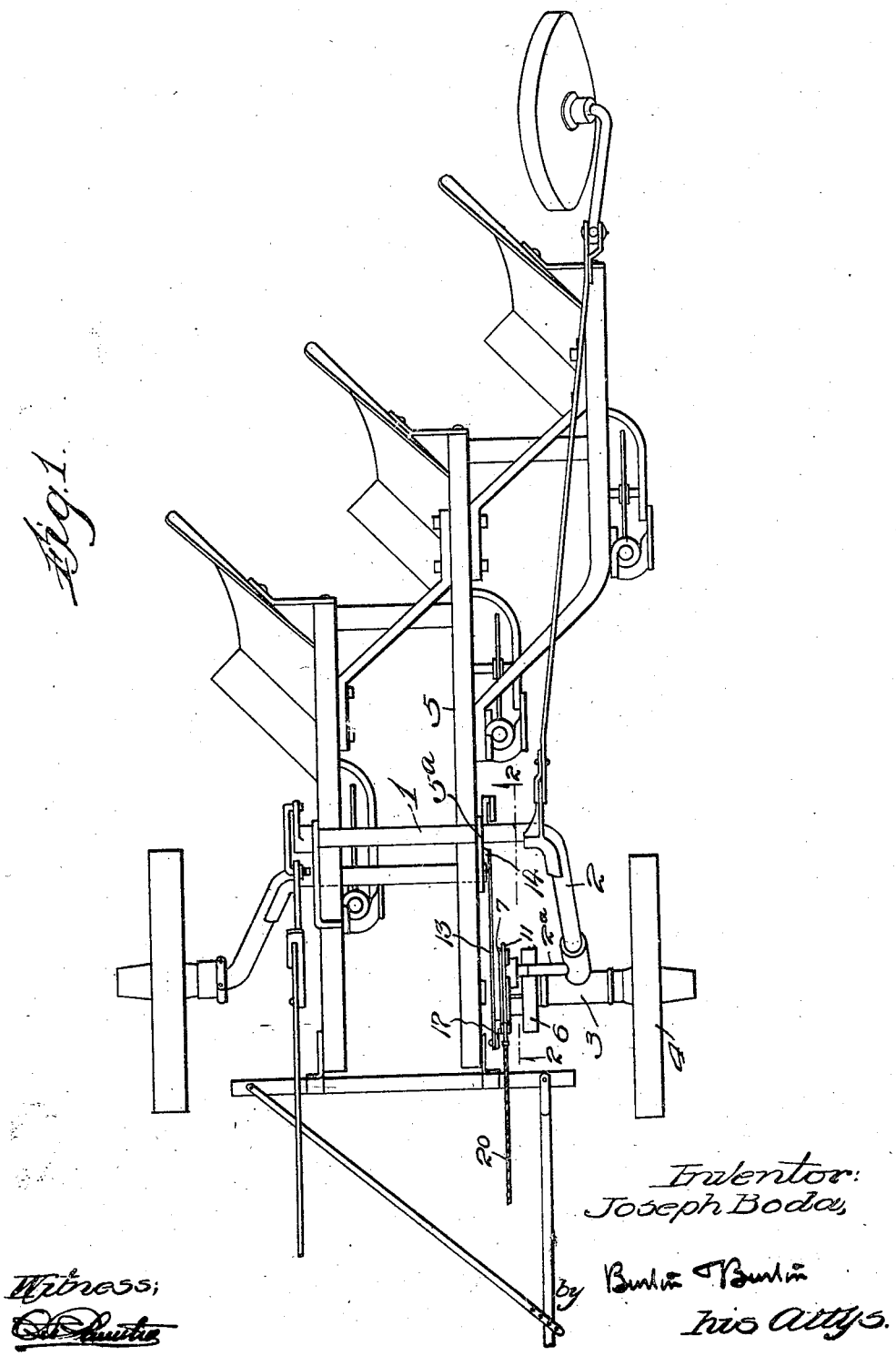

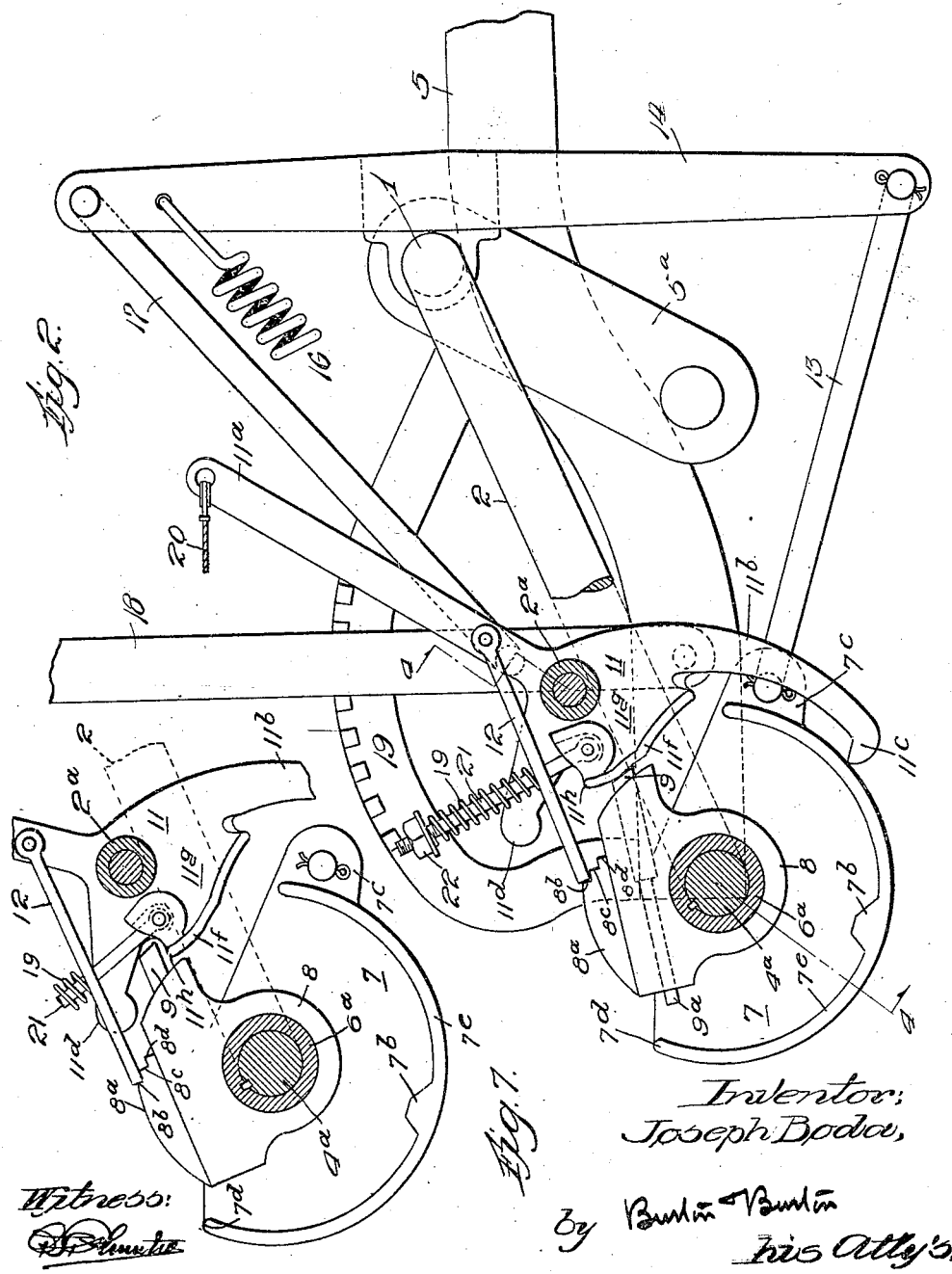

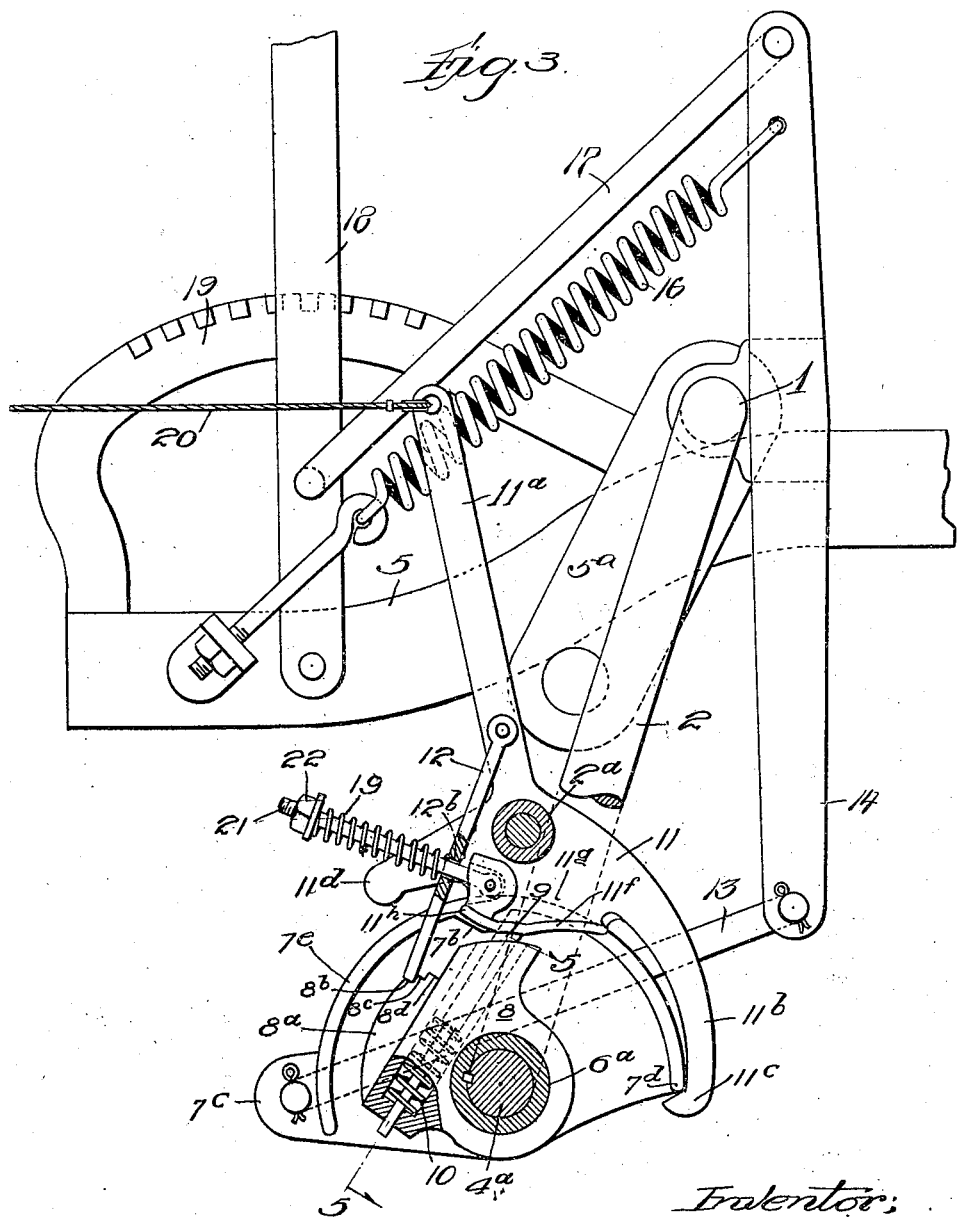

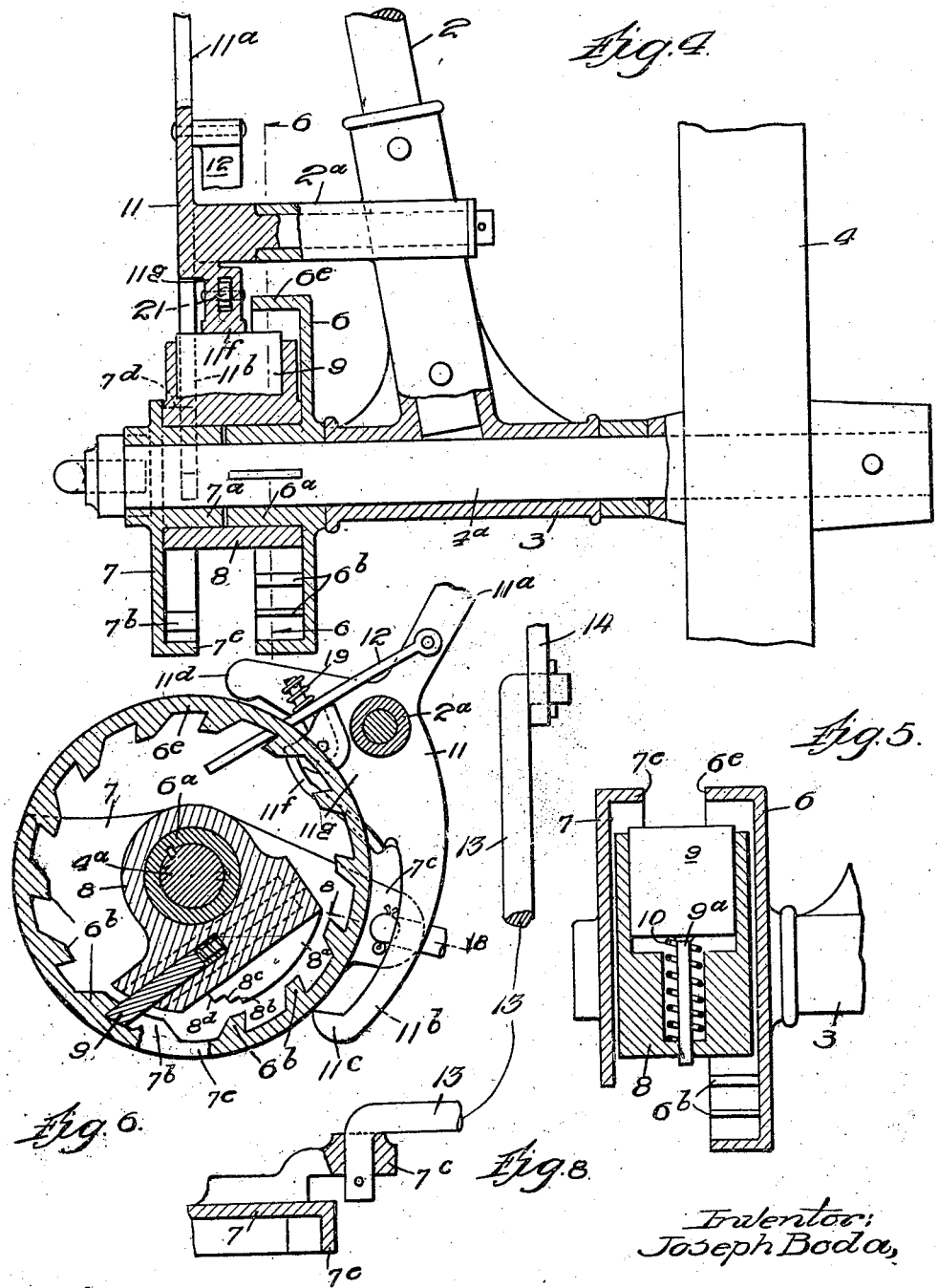

1,472,627

UNITED STATES PATENT OFFICE.

JOSEPH BODA, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

POWER LIFT FOR PLOWS.

Application filed March 13, 1919, Serial No. 282,325. Renewed January 15, 1921. Serial No. 437,629.

*To all whom it may concern:*

Be it known that I, JOSEPH BODA, a citizen of the United States, residing at Moline, in the county of Rock Island and State of Illinois, have invented certain new and useful Improvements in Power Lifts for Plows, of which the following is a specification reference being had to the accompanying drawings, forming a part thereof.

The invention relates to power lift plows.

The general object of the invention is to provide an improved mechanism for lifting and lowering the plows of a gang plow by power derived from the ground wheel in the travel of the plow over the field.

Other objects and advantages of the invention will appear from the specification and drawings.

An embodiment of the invention is shown in the accompanying drawings in which—

Figure 1 is a plan view of a plow structure embodying this invention.

Figure 2 is a vertical section at the line 2—2, on Figure 1, showing the parts at the position occupied when the plows are in the ground, that is, at lowered position.

Figure 3 is a view similar to Figure 2, showing the parts at the elevated position of the plows.

Figure 4 is a section axial with respect to the ground wheel at the line 4—4, on Figure 2.

Figure 5 is a section at the line 5—5, on Figure 3.

Figure 6 is a section at the line 6—6, on Figure 4.

Figure 7 is a view similar to the lower left-hand portion of Figure 2, but showing certain of the parts in a different position.

Figure 8 is a section on the line 8—8 of Figure 6.

The structure shown in the drawings is a gang plow in which the plow-carrying structure is of crank-axle type, that is, having cranked or bent axles on the crank wrists of which the supporting wheels or ground wheels are journaled, the plow beams being carried on one of the axle members, and said axle member being rocked over the crank wrist journaled in the ground wheel for raising and lowering the axle member, and thereby lifting and lowering the plow beam. The construction is the customary one in respect to having the land-side wheel and the furrow wheel mounted respectively on the wrist of independent crank axles which are each adjustable angularly about the axis of the axle member for varying the depth at which the plows operate, and accomodating the landside wheel and the furrow wheel respectively to each other according to the depth of furrow which is made. For the purpose of the present invention, it is only necessary to consider the crank axle upon the wrist of which the landside wheel is journaled, and the parts connected therewith for rocking said crank axle over the wrist on which the landside wheel is journaled for raising and lowering the plow beams which are carried by the axle member of that crank axle. So much of the structure as is concerned with this invention will now be described in detail.

The plow has a crank axle 1, having a crank 2 and a crank wrist 3, with a landside wheel 4 carried by the crank wrist. A plow beam 5 is carried by the crank axle being attached thereto by means of the member 5$^a$ illustrated in Figure 1.

The lifting mechanism includes the following;

The crank wheel 4 is journaled to the crank axle by being fixed to a short shaft 4$^a$, which in turn is journaled in the crank wrist 3 so that the shaft 4$^a$ turns with the land wheel. This shaft extends through the crank wrist 3 and has fixed thereto an annular disc 6 having a hub 6$^a$ and interior ratchet teeth 6$^b$. Loosely journaled on the shaft 4$^a$ is a lifting disc 7 provided with a hub 7$^a$ corresponding in diameter to the hub 6$^a$ of ratchet wheel 6, and also having a single interior ratchet tooth 7$^d$. The member 7 has a crank portion 7$^c$ which is connected to the lifting linkage by a link 13 as will be later described so that rotation of the member 7 will operate the lifting linkage. With this construction, when the plow is being pulled forward, the wheel 4, the shaft 4$^a$ and the ratchet disc 6 rotate continuously but the member 7 rotates only when connected to the ratchet disc by a mechanism that will now be described.

The connecting mechanism includes a dog member 8 which is journaled on the two hubs 6$^a$ and 7$^a$ of the ratchet discs 6 and 7.

One side of this member is enlarged and within the enlargement is mounted a spring pressed ratchet head 9 shaped to engage the ratchet teeth $6^b$ and $7^b$ respectively. The head 9 is normally biased outwardly by means of the spring 10 encircling the stem $9^a$ attached to the head as shown in Figure 5. The normal tendency is, for ratchet head 9 to lock the member 7 so that it will rotate with a continuously rotating disc 6, but such action on the part of the ratchet tooth is controlled by means of a controlling mechanism as follows:

The controlling mechanism includes a lever 11 journaled on an extension $2^a$ of the crank arm 2. This lever has an upwardly extending arm $11^a$ arranged to be operated by means of a cable 20 shown in Figures 2 and 3. It also has a downwardly extending curved arm $11^b$ provided with a locking hook $11^c$ which serves to lock the member 7 in one of its positions as will be hereinafter described. The lever 11 also has a cam surface $11^g$ which co-acts with the spring pressed head 9, such surface being shaped so that it maintains the head 9 out of engagement with the teeth of the ratchet discs 6 and 7 whenever the controlling lever is in the position shown in Figure 2. When, however, the cable 20 is pulled forwardly rocking the lever 11 in a counterclockwise direction the cam surface $11^f$ will pass the spring pressed ratchet head 9 to the position shown in Figure 7, thereby permitting the head to spring into engagement with the ratchet teeth of the discs 6 and 7 and lock them together. On account of the fact that the disc 6 rotates continuously it must be provided with a plurality of ratchet teeth so that whenever the plunger head 9 moves outwardly it will engage a tooth of said disc but the disc 7 need have only one tooth since it stops in certain predetermined positions and the tooth is always in a proper position to be engaged to secure operation of the mechanism.

When the lever 11 has been moved counterclockwise to permit the head 9 to engage the ratchet discs, said discs will move in a counterclockwise direction, the disc 7 moving from the position shown in Figure 2 to that shown in Figure 3, whereupon the head 9 will again engage the cam surface $11^f$ of lever 11 and be disengaged from the ratchet teeth of the discs 6 and 7. Simultaneously, the hook $11^c$ will hook over the end $7^d$ of disc 7 thereby locking the disc in position.

The locking action of the controlling lever 11 is insured through a mechanism including a member 12 pivoted to the lever and extending over the dog 8 as shown in Figures 2 and 3. There is also pivoted to the lever 11, a rod 21 which extends through an aperture in member 12, has a nut 22 on its outer end and is encircled by a coil spring 19 which normally tends to press the member 12 downwardly or counterclockwise as shown in Figure 2. The dog 8 has a cam surface $8^a$ which, when the dog is rotated in a counterclockwise direction, engages the end arm 12 and tends to force it upwardly in a clockwise direction, thereby, exerting through the spring 19, a force on the lever 11 tending to move it in a clockwise direction. This action tends to snap the hook $11^c$ into position over the end $7^d$ of the disc 7 and insures a positive locking action. The cam surface $8^a$ of the dog 8 ends in notches $8^b$, $8^c$ and $8^d$ which are positioned so that, at about the time the hook $11^c$ hooks behind the part $7^d$ of disc 7, the member 12 snaps down into one of the notches or onto one of the steps in the cam surface. The ratchet head 9 has been simultaneously disengaged so that there is no positive force tending to move the dog 8 and consequently the member 12 tends to hold the dog in position and to positively prevent its moving backward in a clockwise direction.

The disc 7 is connected to the lifting linkage by means of a link 13 which is pivoted to a lever 14 that in turn is pivoted to the crank axle 1. The upper end of this beam is connected by a link 17 to a lever 18 pivoted to the plow beam 5 and arranged to cooperate with the locking segment 19 by means of an ordinary locking detent, not shown. When the disc 7 is moved from the position shown in Figure 2 to that shown in Figure 3 the crank axle 2 is moved as shown in said figure, thereby, raising the beam relative to the axle or lowering the axle relative to the beam. The degree of raising and lowering may be varied by varying the lever 18 along the segment 19 which changes the effective action of the linkage.

The operation of the mechanism, as a whole, is as follows:

Assuming that the parts are in the position shown in Figure 2 with the plow lowered and that it is desired to raise the plows, the operator pulls on the cable 20 which rocks the controlling lever in a counterclockwise direction. This rocking movement causes the cam surface $11^f$ to pass the spring pressed ratchet head 9 which thereupon springs to the position shown in Figure 7 and locks the disc 7 with the continuously rotating disc 6. These two discs then rotate in a counterclockwise direction to the position shown in Figure 3. Just prior to arriving in this position the cam surface $8^a$ of the dog 8 presses against the member 12, thereby, insuring that the hook $11^c$ will engage behind the surface $7^d$. At the same time the spring pressed ratchet head 9 again engages the cam surface $11^f$ which causes it to be forced out of engagement with the ratchet teeth of discs 6 and 7, thereby, unlocking the discs, whereupon, the disc 7 stops. The member 12 simultaneously snaps onto one of the notches 8$^b$, 8$^c$ and 8$^d$, holding the dog 8 in position and preventing any backward movement of it. The movement of disc 7 has moved the crank axle from the position shown in Figure 2 to that in Figure 3 which movement has effected the raising of the plow beams relative to the crank wrist, or, to express it in another way, the crank axle has been swung counterclockwise and the crank wrist lowered relative to the plow beams.

If it is desired to lower the plows from the position shown in Figure 3, the operator again pulls on the cable 20 which rocks the controlling lever 11 in a counterclockwise direction. This rocking movement is limited by means of the arm 11$^d$ which strikes the periphery of disc 7, such limiting action serving to prevent the member 11 from being moved sufficiently far to permit the spring pressed plunger 9 to lock the discs 6 and 7 together. The limited movement of the control lever 11 pulls the hook 11 out from behind the portion 7$^d$ of disc 7, whereupon, the weight of the parts, that is, the plow beams, bottoms and associated mechanism rotates the mechanism to the position shown in Figure 2 where it is again ready for the lifting operation. This return movement does not disturb the dog 8 which cannot rotate in a clockwise direction because of the member 12 and it does not affect the disc 6 because the spring pressed ratchet head 9 is kept out of engagement with the ratchet teeth by means of the cam surface 11$^f$ which continues to engage the ratchet head.

It is to be understood that the structure shown is for the purpose of illustration only and that variation may be made without departing from the spirit and scope of the appended claims.

What is claimed is:

1. A powerlift plow having plow beams, supporting wheels, a crank axle, powerlift mechanism operated by travel of one of the supporting wheels for swinging the crank axle relative to the plow beams to raise and lower the plow, said powerlift mechanism including a clutch carried by the crank axle and connected to the plow beams through a linkage mechanism, controlling means for the clutch including a lever adapted to be momentarily tripped by a jerk on a cable or the like, said controlling means serving, when the lever is momentarily actuated when the plows are lowered, to operate the clutch to set the lifting mechanism into operation and automatically stop and lock it with the plows in raised position, and means associated with the lifting mechanism for limiting the movement of the control lever when the lever is momentarily actuated with the plows in raised position so that actuation of the lever will unlock the plows but will be positively prevented from setting the lifting mechanism into operation.

2. A powerlift plow having plow beams, a crank axle carrying a supporting wheel, lifting mechanism for swinging the axle relative to the plow beams, said mechanism including a clutch mounted on an axis substantially coincident with the axis of the supporting wheel, and controlling means for the clutch including a lever adapted to be momentarily tripped by a cable or the like, said controlling means serving, when the lever is momentarily actuated when the plows are lowered, to operate the clutch to set the lifting mechanism into operation and automatically stop and lock it with the plows in raised position, and means associated with the lifting mechanism for limiting the movement of the lever when it is momentarily actuated with the plows in raised position so that its actuation will unlock the plows, but will not set the lifting mechanism into operation.

3. A powerlift plow having plow beams, a crank axle, a supporting wheel carried by the crank axle, a clutch disk rotated continuously by and having its axis substantially coincident with the axis of the supporting wheel, a lifting disk having connection with one of the plow beams so that, when the disk is rotated, the crank axle will be swung relative to the plow beams, means for connecting the stationary disk with the rotating disk, and a controlling and locking means normally maintaining the connecting means out of engagement with the disks but arranged so that, when momentarily actuated by a pull in one direction, it will free the connecting means to permit it to lock the disks together after which it will automatically disconnect the connecting means and lock the lifting disk in raised position, said lifting disk having a portion so formed that, when the controlling means is momentarily actuated when the plows are raised, its motion will be limited so that it cannot free the connecting means but will have only movement enough to unlock the locking means to permit the plows to lower by gravity.

4. A powerlift plow having plow beams, a crank axle carrying a supporting wheel, a clutch disk rotated by and mounted on substantially the same axis as the supporting wheel, a lifting disk having connection with one of the plow beams, a dog device for connecting the two disks together, and controlling means normally holding the dog device out of engagement with the disks but arranged so that, when momentarily actuated when the plows are lowered, it will permit the dog to lock the disks together thereby causing rotation of the lifting disk to swing the crank axle relative to the plow beams, said controlling mechanism including means for disengaging the dog device after the lifting disk has moved a predetermined amount and for locking the disk in raised position, said lifting disk having a portion arranged to limit the movement of the controlling mechanism when it is actuated with the plows raised so that it cannot be moved sufficiently to unlock the dog device but will be moved sufficiently to unlock the lifting disk to permit the plows to lower by gravity.

In testimony whereof, I have hereunto set my hand at Plano, Illinois, this 27 day of February, 1919.

JOSEPH BODA.